(12) United States Patent
Townsend et al.

(10) Patent No.: US 7,856,732 B2
(45) Date of Patent: Dec. 28, 2010

(54) SYSTEM FOR MOUNTING AN OBJECT TO A SURFACE

(75) Inventors: Michael Townsend, Gilbert, AZ (US); Patrick Plehn, Chandler, AZ (US); Keith Charvonia, Tempe, AZ (US)

(73) Assignee: Omnimount Systems, Inc., Phoenix, AZ (US)

( * ) Notice: Subject to any disclaimer, the term of this patent is extended or adjusted under 35 U.S.C. 154(b) by 50 days.

(21) Appl. No.: 12/367,376

(22) Filed: Feb. 6, 2009

(65) Prior Publication Data

US 2010/0199598 A1 Aug. 12, 2010

(51) Int. Cl.
*G01D 21/00* (2006.01)
*G01B 3/06* (2006.01)

(52) U.S. Cl. ........................................................ 33/613

(58) Field of Classification Search ..................... 33/613
See application file for complete search history.

(56) References Cited

U.S. PATENT DOCUMENTS

| | | | |
|---|---|---|---|
| 4,686,769 A * | 8/1987 | Rock et al. ..................... 33/197 |
| 5,680,709 A * | 10/1997 | Stone ........................... 33/613 |
| 6,421,928 B1 * | 7/2002 | Miller .......................... 33/520 |
| 6,473,983 B1 * | 11/2002 | Gier ............................. 33/613 |
| 6,880,259 B1 * | 4/2005 | Schultz ......................... 33/613 |
| 6,952,887 B2 * | 10/2005 | Muchnik ....................... 33/666 |
| 7,020,975 B2 * | 4/2006 | Ernst et al. .................... 33/613 |
| 7,350,312 B1 * | 4/2008 | Grillo ........................... 33/613 |
| 7,373,733 B2 * | 5/2008 | Ganter .......................... 33/645 |
| 7,421,796 B1 * | 9/2008 | DeAngelis-Morris ........ 33/613 |
| 7,690,129 B2 * | 4/2010 | Bender ......................... 33/613 |
| 2010/0011602 A1 * | 1/2010 | Houssian et al. .............. 33/613 |

* cited by examiner

*Primary Examiner*—Christopher W Fulton
(74) *Attorney, Agent, or Firm*—DLA Piper LLP (US)

(57) ABSTRACT

A system for mounting an object such as a flat screen television on a surface such as a wall. A mounting template is fastened to the surface and defines multiple sets of openings corresponding to multiple mounting configurations. Wall brackets are removably secured within the openings and are then fastened to the surface. Object spacers are fastened to mounting locations on the object corresponding to the mounting configuration of the wall brackets, and are connected to the wall brackets to secure the object to the wall. A level may be secured within the mounting template. The mounting template may include fold lines to facilitate packaging and storage of the mounting template.

14 Claims, 4 Drawing Sheets

SYSTEM FOR MOUNTING AN OBJECT TO A SURFACE

BACKGROUND OF THE INVENTION

Flat panel displays are increasingly popular for both home and business uses. Because of their thin profiles, flat panel displays are typically mounted on load-bearing surfaces, such as walls or ceilings. Although flat panel displays are becoming increasingly thin, they are also increasing in width and height, making them heavy and difficult to maneuver when mounting.

A typical mounting procedure requires a complex set of tasks, including locating studs behind drywall, measuring the distance between the mounting holes on the rear of the flat panel display or mounting plate, mapping the location of the mounting holes onto the wall and drilling screws into the wall to fix the display or mounting plate to the wall, making sure that the screws are drilled into locations that will allow the display to be level. Incorrect measurements, stud location, mapping or drilling can result in the display being mounted at an incorrect angle or require the long and complicated process of mounting to be repeated, leaving unsightly holes in the drywall.

Other typical mounting procedures require holding a heavy mounting device against the wall, leveling the device with a level, and marking drill points on the wall through holes in the mounting device. Screws are drilled through the holes in the mounting device into the wall. Because the mounting device may be heavy and awkward, however, this method is cumbersome and may require multiple people to aid in leveling and screwing while others hold the mounting device in place. The mounting device may also cause the mounted display to project farther away from the wall, taking up space in the room and negating the advantages of the display's thin profile. These prior art techniques are also used for other objects to be mounted on a surface, such as, for example, artwork, mirrors, etc., particularly if those objects have fixed mounting locations, such as rear hooks or openings that must be accurately mapped to the mounting surface.

SUMMARY OF THE INVENTION

A system for mounting an object on a surface according to the present invention includes a mounting template defining at least one set of openings corresponding to a configuration of mounting locations on the object, and plurality of first links that are removably securable within the openings and are configured to be fastened to the surface.

In one embodiment, a plurality of second links are also provided that are configured to be fastened to the mounting locations on the object and that are connectable to the first links. The first links may be wall brackets sized to be removably retained within the openings in the mounting template and to be fastened to a wall, and the second links may be object spacers configured to connect to the wall brackets and to be fastened to a surface of the object.

In one embodiment, multiple sets of openings corresponding to multiple configurations of mounting locations on objects are provided. Three sets of openings, for example, may be provided that correspond to the 100 mm×100 mm, 100 mm×200 mm and 200 mm×200 mm VESA standards.

One embodiment of the invention further comprises a level that is secured within the mounting template.

In one embodiment, the mounting template is constructed of cardboard and includes fold lines to facilitate packaging and storage of the mounting template. The mounting template may include horizontal and vertical fold lines oriented such that the mounting template can be folded so that the three sets of openings overlap, and so that the first links can be inserted into the overlapped openings to retain the folded structure. A slot sized to removably retain the second links when packaged may also be provided.

A method for mounting an object to a surface according to the present invention includes the steps of providing a template with multiple sets of openings corresponding to multiple mounting configurations; fastening the template to the surface; inserting first links into a set of openings on the template corresponding to a desired mounting configuration; fastening the first links to the surface; and mounting the object on the first links.

In one embodiment, the method also includes the steps of fastening second links to the object in the desired mounting configuration, and mounting the object to the surface by connecting the second links on the objects to the first links on the wall. The method may further include the step of removing the template from the surface after the first links are fastened to the surface.

DETAILED DESCRIPTION OF THE INVENTION

Figure 1:
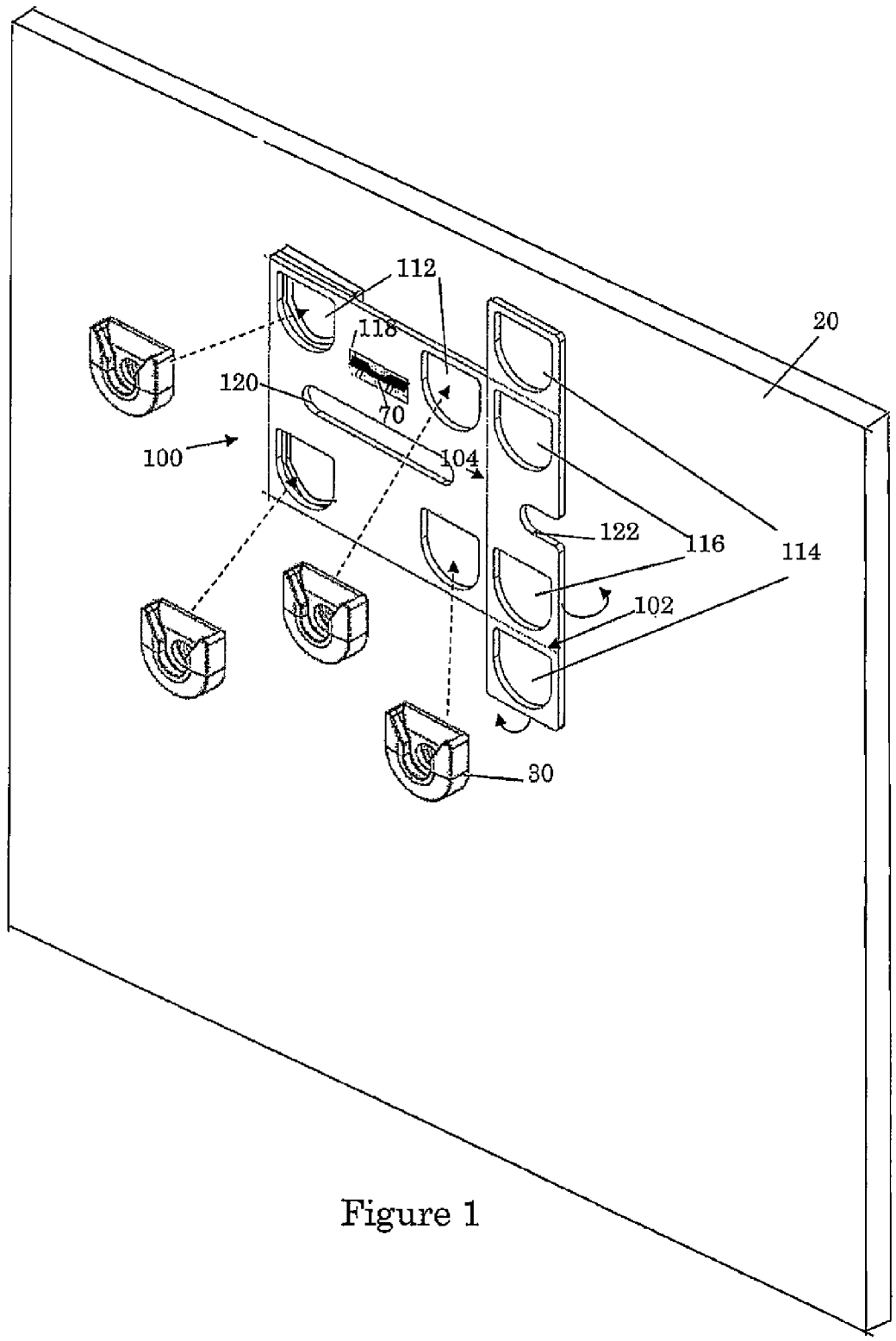
FIG. 1 is a perspective view of a mounting template and wall brackets in a partially-folded configuration according to the invention.
Figure 2:
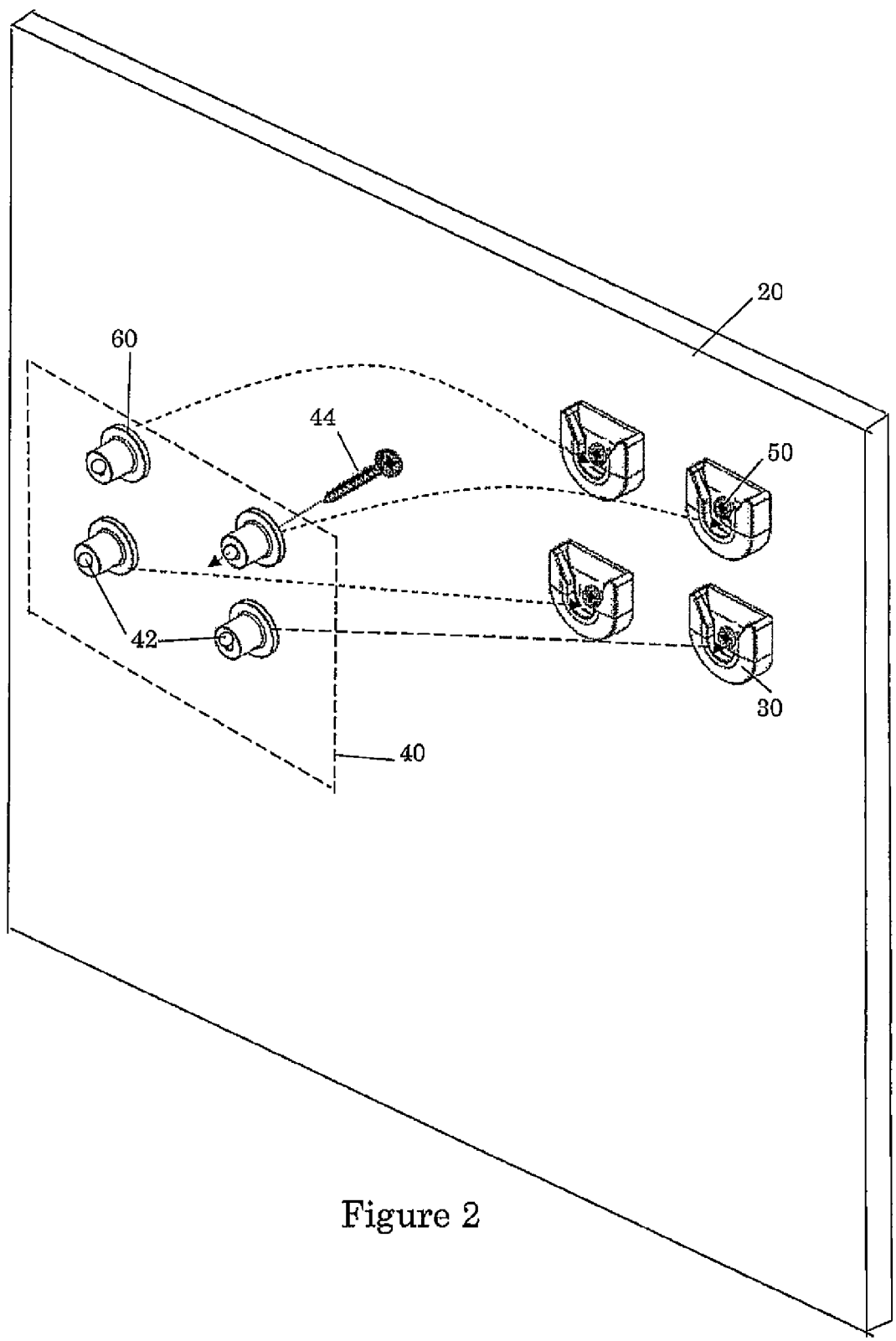
FIG. 2 is a perspective view showing the interaction between the wall of FIG. 1 and object spacers.
Figure 3:
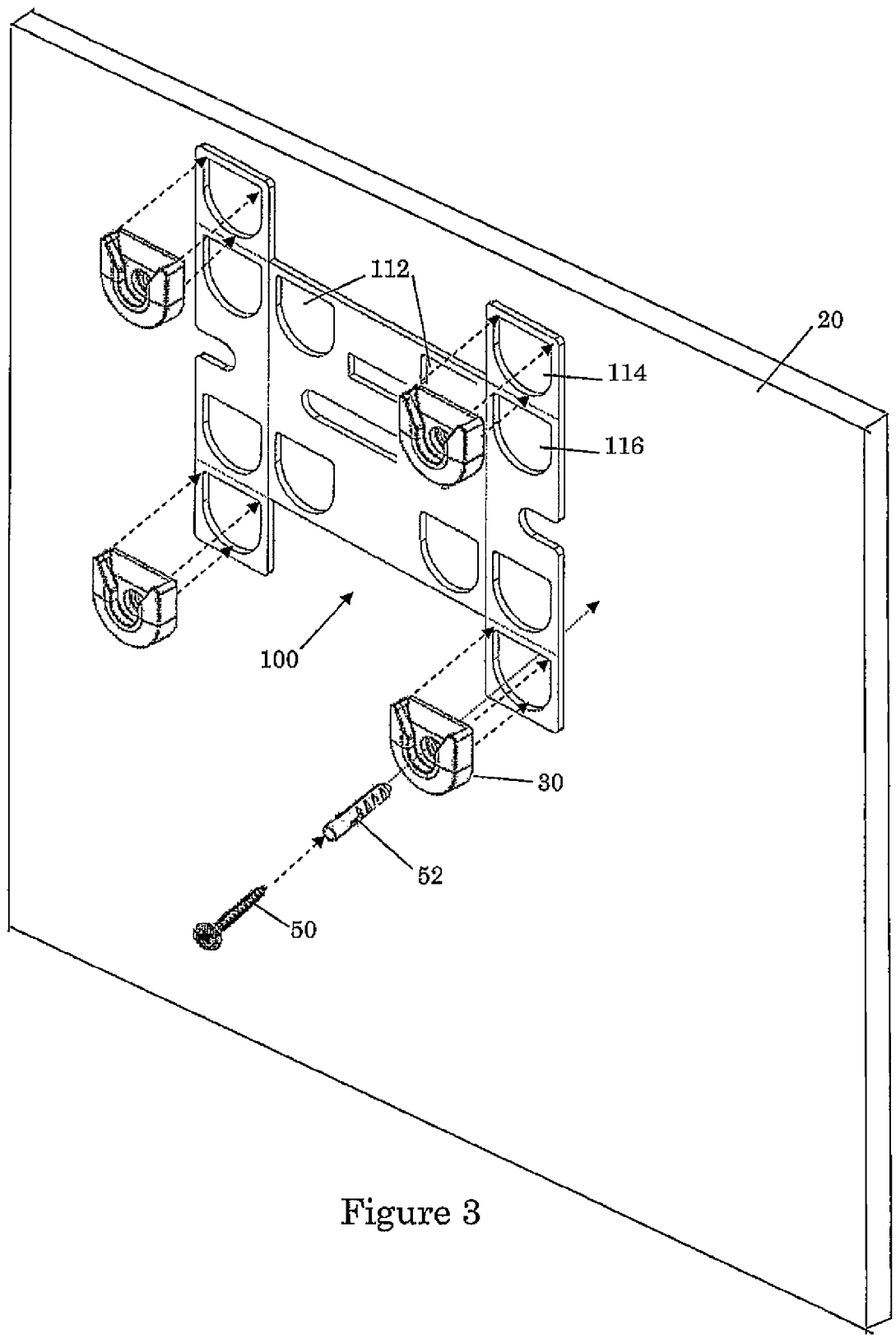
FIG. 3 is a perspective view of the mounting template and wall brackets of FIG. 1 in a fully-extended configuration.

A mounting system according to the present invention is illustrated in FIGS. 1-3. The system includes a mounting template 100 that is fixed to a load-bearing surface 20, such as a wall or a ceiling, in order to facilitate the mounting of an object 40, such as a flat screen television, to the wall or ceiling. In one embodiment, mounting template 100 is constructed of cardboard. Alternatively, template 100 may be constructed of other lightweight materials such as paper or plastic. Template 100 is fixed to surface 20 by a retaining pin, tape, putty or any other fastener capable of supporting the weight of mounting template 100 on surface 20.

Mounting template 100 includes multiple openings that are sized to removably retain first links (wall brackets) 30, and that are spaced and configured to correspond to mounting locations on the object to be mounted. In the embodiment illustrated in FIGS. 1 and 3, template 100 includes three sets of openings 112, 114 and 116. As shown in FIG. 3, each set of openings corresponds to a different configuration of mounting locations on an object. For example, the first set of openings 112 corresponds to a relatively small spacing of mounting locations; the second set of openings 114 corresponds to a relatively large spacing of mounting locations; and the third set of openings 116 corresponds to a medium spacing of mounting locations.

A level, such as a bubble level 70, is removably attached to mounting template 100. Level 70 may be secured, for example, within an opening 118 formed in mounting template 100 or through any other suitable means capable of holding level 70 in place relative to mounting template 100. Level 70 ensures that mounting template 100 is level when fixed to surface 20.

Template 100 in a fully-extended (completely unfolded) configuration is shown in FIG. 3. As shown in FIG. 3, the fully-extended template 100 is attached to surface 20 by appropriate fasteners such as retaining pins, for example. Wall brackets (first links) 30 are arranged within the appropriate set of openings 112, 114 or 116 to correspond to a configuration of mounting locations 42 on the object 40, such as a flat screen television, to be mounted on surface 20 (FIG. 2).

In one embodiment, the sets of openings 112, 114 and 116 correspond to different standards of the Video Electronics Standards Association (VESA), in particular, to the 100 mm×100 mm, 100 mm×200 mm and 200 mm×200 mm standards. The first set of openings 112 corresponds to the 100 mm×100 mm VESA standard, the second set of openings 114 correspond to the 200 mm×200 mm VESA standard, and the third set of openings correspond to the 100 mm×200 mm VESA standard. FIG. 1 shows wall brackets 30 being inserted into the first set of openings 112 for the 100 mm×100 mm VESA standards, whereas FIG. 3 shows brackets 30 being inserted into the second set of openings 114 for the 200 mm×200 mm VESA standard.

These VESA standards are of course merely examples of configurations to which openings 112, 114 and 116 may correspond, and the invention is not limited thereto. Sets of openings spaced in any other desired configuration may be provided, and more or less than three sets of openings may be provided. Template 100 may include just a single set of openings corresponding to a single mounting configuration, for example. However, providing multiple sets of openings provides greater flexibility in mounting objects with different mounting configurations.

As shown in FIG. 3, once wall brackets 30 are inserted into the appropriate set of openings 112, 114 or 116, wall brackets 30 are fixed to surface 20 by an appropriate fastener such as, for example, a screw 50 and drywall anchor 52. Mounting template 100 may then be removed from surface 20.

FIG. 2 shows wall brackets 30 attached to surface 20 through screws 50, after template 100 has been removed. Second links, such as object spacers 60, are fixed to a plurality (four in the illustrated example) of mounting locations 42 arranged on object 40. Mounting locations 42 may be located on a rear surface of a flat screen television, for example. The spacing of mounting locations 42 on object 40 should correspond to the mounting configuration of wall brackets 30 on surface 20. For example, if object 40 is a flat screen television with a 200 mm×200 mm VESA mounting configuration, then the second set of openings 114 should be chosen to mount wall brackets 30 to wall 20.

Object spacers 60 can be constructed out of any material with sufficient strength to support the weight of object 40, such as, for example, plastic or metal. Object spacers 60 may be fixed to mounting locations 42 by any appropriate means such as a screw, for example. Once object spacers 60 are fixed to object 40, spacers 60 are inserted into wall brackets 30, as indicated by the arrows in FIG. 2, to thereby mount object 40 on surface 20.

Although the first links are described as wall brackets 30 and the second links are described as object spacers 60, the scope of the invention is not limited thereto. First link 30 may be configured in any suitable fashion, as long as it is capable of holding the weight of object 40, securing to surface 20 and connecting to second link 60. Likewise, the second link may be configured in any suitable fashion, as long as it is capable of holding the weight of object 40, and securing to mounting locations 42 of object 40 and connecting to first link 30. Moreover, the second links may be integrated into or already connected in an appropriate configuration to the object to be mounted, rather than provided as mountable pieces.

Mounting template 100 is also preferably configured to facilitate packaging, shipping and storage of template 100 and its associated components. In particular, with reference to FIG. 1, template 100 includes horizontal folds 102 and vertical folds 104. The outer peripheral section of template 100 may be folded inward along vertical fold 104 such that the third set of openings 116 are aligned behind the first set of openings 112. Then, the sections of template 100 including the second set of openings 114 may be folded inward (downward and upward) such that all of openings 112, 114 and 116 are stacked and aligned (see left side of FIG. 1). Wall brackets 30 can then be inserted into the overlapped openings 112, 114 and 116 to retain and provide a compact folded configuration for packaging.

In addition, template 100 may also include a central slot 120 and side slots 122 for the purpose of storage and retention of spacers 60. When template 100 is folded, side slots 122 overlap the ends of central slot 120 (FIG. 2). Spacers 60 may then be placed side-by-side within slot 120 and the overlapping side slots 122. Moreover, as discussed above, template 100 may include an appropriate opening 118 for retention of level 70.

In order to unpack and use the system, wall brackets 30 are removed from the stacked and aligned openings 112, 114, 116, and spacers 60 are removed from the overlapped slots 120, 122. Template 100 is then unfolded along fold lines 102 and 104 to provide the sets of openings 112, 114 and 116 in their proper mounting configurations.

Figure 4:
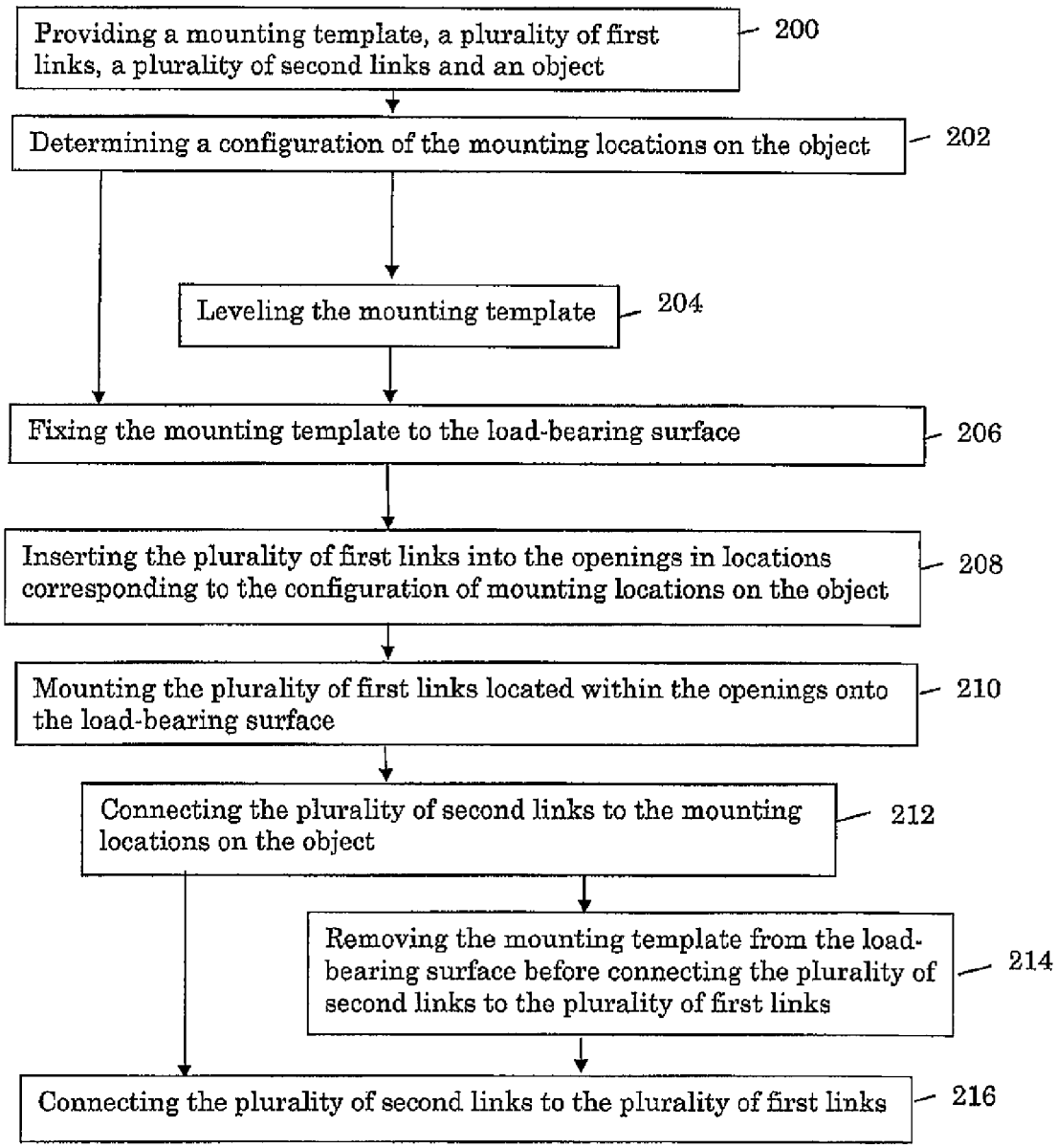
FIG. 4 is a flowchart of a mounting system according to the present invention.

FIG. 4 is a flowchart of a method for mounting an object to a surface according to the present invention. At step 200, a mounting template 100, a plurality of first links 30, a plurality of second links 60 and an object 40, such as those discussed in relation to FIG. 1-3, are provided. At step 202, object 40 is examined to determine the configuration of mounting locations 42 thereon.

An optional step 204 includes leveling mounting template 100 with level 118 mounted within template 100. Mounting template 100 is then fixed to a load-bearing surface at step 206. First links 30 are inserted at step 208 into the appropriate set of openings 112, 114 or 116 of mounting template 100 that correspond to the configuration of mounting locations 42 on object 40.

First links 30 are fastened to the load-bearing surface at step 210. Once first links 30 are fastened to the load-bearing surface, template 100 may be removed from the load-bearing surface (step 214). At step 212, second links 60 are fastened to mounting locations 42 of object 40. At step 216, second links 60 are connected to first links 30 to thereby retain object 40 on the load-bearing surface.

The embodiments of the invention described herein are illustrative, rather than restrictive. Modification may be made without departing from the spirit of the invention as defined by the following claims and their equivalents.

The invention claimed is:

1. A system for mounting an object on a surface comprising:
   a mounting template defining at least one set of openings corresponding to a configuration of mounting locations on the object; and
   a plurality of first links that are removably securable within the openings and are configured to be fastened to the surface, wherein
   there are multiple sets of openings corresponding to multiple configurations of mounting locations on objects, and the mounting template further comprises horizontal and vertical fold lines oriented such that the mounting template can be folded so that the multiple sets of openings overlap, and so that the first links can be inserted into the overlapped openings to retain the folded structure.

2. A system for mounting an object as claimed in claim 1, further comprising a plurality of second links that are configured to be fastened to the mounting locations on the object and that are connectable to the first links.

3. A system for mounting an object as claimed in claim 2, wherein the first links are wall brackets sized to be removably retained within the openings in the mounting template and to be fastened to a wall.

4. A system for mounting an object as claimed in claim 3, wherein the second links are object spacers configured to connect to the wall brackets and to be fastened to a surface of the object.

5. A system for mounting an object as claimed in claim 2, the mounting template further comprising a slot sized to removably retain the second links when packaged.

6. A system for mounting an object as claimed in claim 1, wherein there are three sets of openings.

7. A system for mounting an object as claimed in claim 6, wherein the three sets of openings correspond to the 100 mm×100 mm, 100 mm×200 mm and 200 mm×200 mm VESA standards.

8. A system for mounting an object as claimed in claim 6, wherein the horizontal and vertical fold lines are oriented such that the three sets of openings overlap.

9. A system for mounting an object as claimed in claim 1, and further comprising a level that is secured within the mounting template.

10. A system for mounting an object as claimed in claim 1, wherein the mounting template further comprises fold lines to facilitate packaging and storage of the mounting template.

11. A system for mounting an object as claimed in claim 1, wherein the mounting template is constructed of cardboard.

12. A method for mounting an object to a surface comprising:
providing a template with multiple sets of openings corresponding to multiple mounting configurations of mounting locations on objects, wherein the mounting template further comprises horizontal and vertical fold lines oriented such that the mounting template can be folded so that the multiple sets of openings overlap, and so that the first links can be inserted into the overlapped openings to retain the folded structure;
removing the first links from the overlapped openings and unfolding the folded structure;
fastening the template to the surface;
inserting first links into a set of openings on the template corresponding to a desired mounting configuration;
fastening the first links to the surface; and
mounting the object on the first links.

13. A method for mounting an object as claimed in claim 12, further comprising:
fastening second links to the object in the desired mounting configuration; and
mounting the object to the surface by connecting the second links on the objects to the first links on the wall.

14. A method for mounting an object as claimed in claim 12, further comprising:
removing the template from the surface after the first links are fastened to the surface.

* * * * *